April 25, 1950     A. J. MIDDLER     2,505,057
TOY VEHICLE
Filed March 7, 1945     2 Sheets-Sheet 1
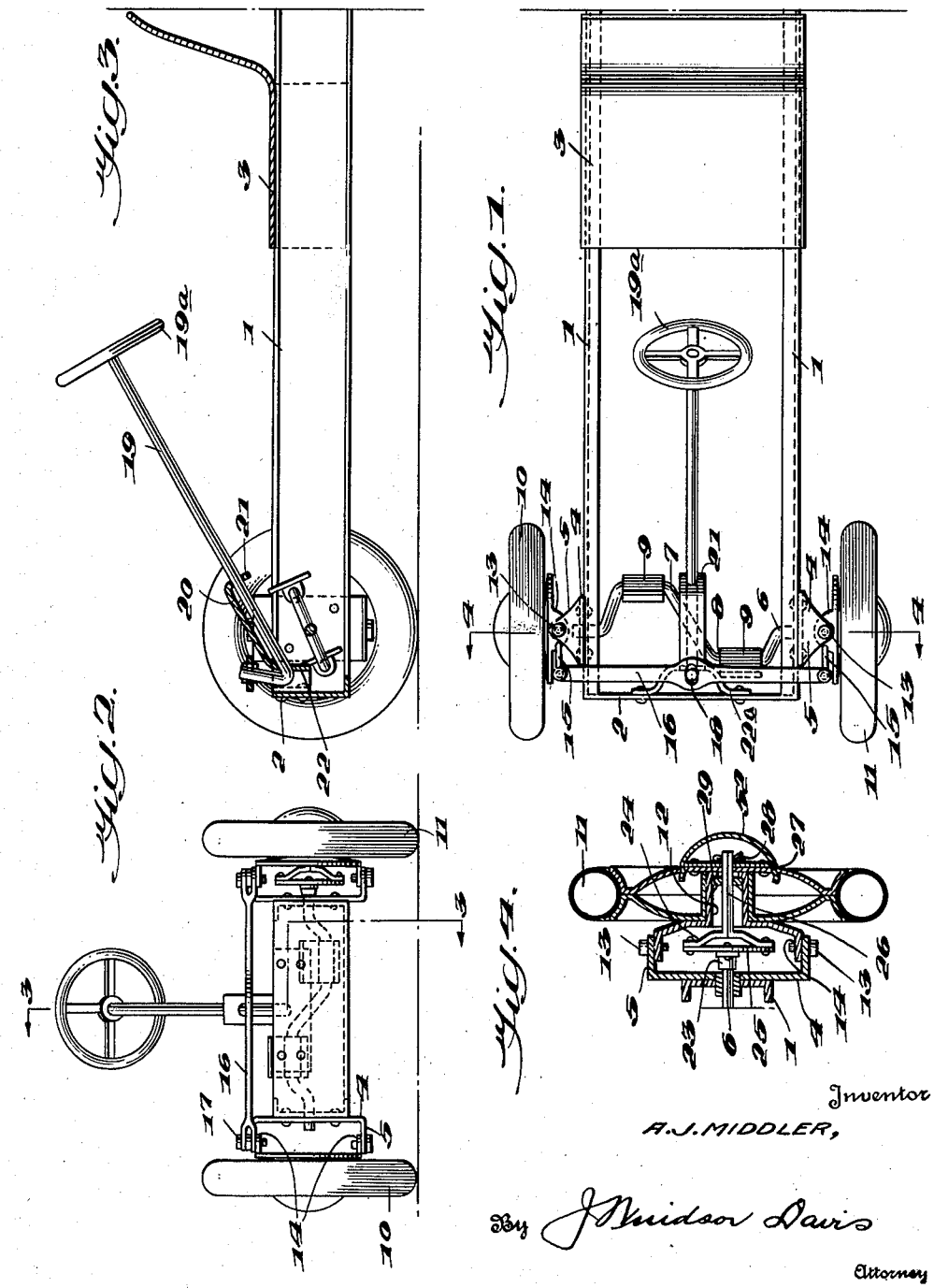
Inventor
A. J. MIDDLER,
By J. Nuidson Davis
Attorney

April 25, 1950 A. J. MIDDLER 2,505,057
TOY VEHICLE
Filed March 7, 1945 2 Sheets-Sheet 2
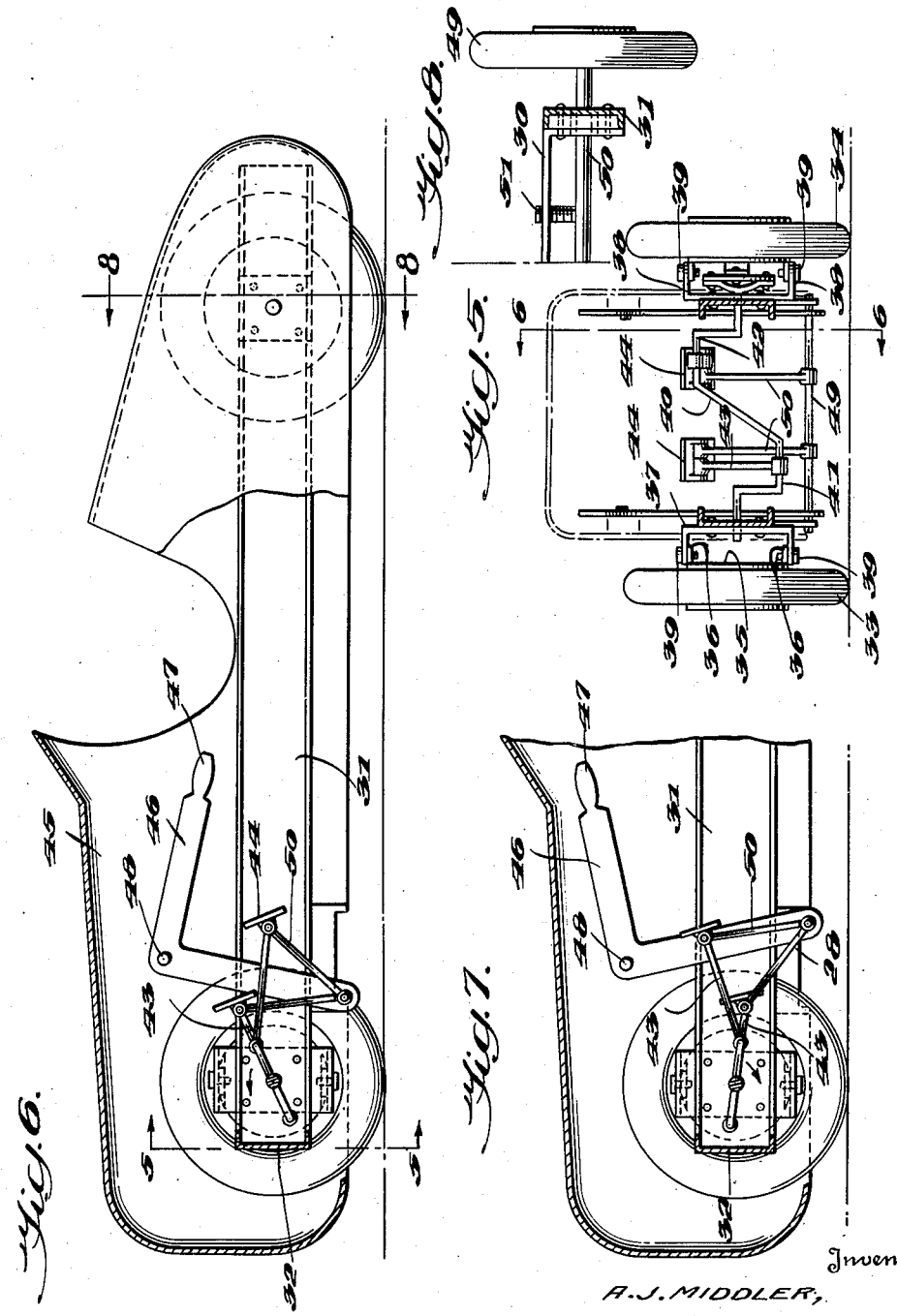
Inventor
A. J. MIDDLER,
By Thudson Davis
Attorney Patented Apr. 25, 1950

2,505,057

UNITED STATES PATENT OFFICE 2,505,057

TOY VEHICLE

Alexander J. Middler, Detroit, Mich.

Application March 7, 1945, Serial No. 581,523

4 Claims. (Cl. 280—267)

This invention relates to a child's vehicle adapted to be propelled by pedalling of the rider and has for its object to provide a toy or vehicle of this type which will have an easy, non-centering driving action, which will be reliable and which lends itself to incorporation in a wide variety of body styles and types which will be attractive to children.

A principal object of the invention is to provide an improved arrangement for driving and steering the front wheels of a pedal propelled vehicle.

More particularly it is an object to provide a drive shaft in the form of a front axle having crankthrows formed in the length thereof, to mount the front wheels on spindles outwardly and axially of the ends of the axle and to connect at least one of these spindles with the axle through a universal joint of economical and reliable construction.

A further object is to mount pedals directly on the cranks of the axle so that pedalling pressure is exerted directly on the axle thus obviating all pedal linkages.

Another object is to provide an improved and simplified steering device for the front wheels which consists essentially of steering arms, a tie rod connecting the arms, and a steering shaft which is simply bent at its lower end into an arm which engages an opening in the tie rod.

A further object is to provide an alternate arrangement in which the non-centering action may be directed manually either above or below the direction of force used in pedalling, at the will of the driver, thus providing a reverse drive. The child driver thus gets the effect of "shifting gears," without having to put his feet on the ground.

Other objects and advantages will become hereinafter more fully apparent as reference is had to the accompanying drawings in which my invention is illustrated and in which Figure 1 is a top plan view of a child's automobile omitting the rear portion and rear wheels and having my invention incorporated therein, Figure 2 is a front view of the vehicle of Figure 1, Figure 3 is a longitudinal vertical section taken along the line 3—3 of Figure 2, Figure 4 is a vertical section taken along the line 4—4 of Figure 1, Figure 5 is a vertical section of a modified form of child's automobile taken along the line 5—5 of Figure 6, showing a drive similar to that of Figures 1 to 4 and including a reversible over-centering device for the crankshaft, Figure 6 is a side elevation of the toy of Figure 5 with the front portion thereof broken away along the vertical longitudinal section 6—6 of Figure 5, Figure 7 is a broken section similar to the front end of the view in Figure 6 showing the reversing mechanism in opposite position from that illustrated in Figure 6, and Figure 8 is a vertical section taken along the line 8—8 of Figure 6.

More particularly, 1 refers to the main side frames of a child's automobile having a front cross frame 2. A portion of the body which includes a seat for the child is indicated generally at 3 across the rear of the side frames. Riveted or otherwise secured to the sides 1 near the front end thereof are king pin brackets 4 composed of a sizable plate residing directly adjacent each side frame and laterally extending upper and lower king pin receiving portions 5.

A crankshaft 6 having two spaced cranks 7 and 8 intermediate the ends thereof projects at each end through a side frame 1 and a bracket 4, openings in these members serving as journals for the crankshaft. Bearings may be provided in the side frame, if desired. Each crank 7 and 8 has a foot pedal 9 rotatably mounted thereon for propulsion of the vehicle by a rider.

Each front wheel 10 and 11 turns on a hollow spindle 12. Each spindle has two king pin ears 14 and two king pin pins 13 connect these ears to the king pin portions 5 of the brackets 4. The two wheels 10 and 11 are thus capable of being steered while rotating. A steering arm 15 is rigidly secured to each king pin ear 14, projecting forwardly thereof. A steering link or tie rod 16 is pivotally connected at each end 17 thereof to a steering arm and is provided with an opening 18 substantially intermediate the ends thereof. If this tie rod 16 is moved laterally the wheels 10 and 11 are rotated pivotally on their king pins 13 thus steering the vehicle.

In order to accomplish the lateral movement of the tie rod 16, I provide a steering column 19, having a steering wheel 19a at its upper end and supported near its lower end in a bracket 20. This bracket is elongated, being bent normally at its upper end 21 where it is pierced to receive the steering column 19. The lower end of this bracket is also bent substantially normally at 22 and substantially flared laterally at 22a for attachment to the main cross frame 2. The bent portion 22 is pierced to receive the steering column 19 thus providing a second bearing or point of support for the steering column.

The lower end of the steering column 19 is bent vertically upwardly after passing through the portion 22 where it enters the opening 18 of the steering link 16. The opening in the steering link is larger than the diameter of the steering column to provide a loose, non-binding fit. The steering column, immediately outwardly of its bend abuts the cross member 2. The friction is small and this simple construction is suitable to accept the thrust of the steering column due to the downward component of its own weight.

Between one end of the crankshaft 6 and one wheel 11 I insert a universal joint of simple form, composed of two yoke members 23 and 24 adapted to be attached at their ends, and in normal relation to each other, to a common diaphragm 25 which may be made of leather, of rubber impregnated fabric or other similar flexible material. The yoke 23 has a central collar suitable for receipt of and attachment to the crankshaft 6 while the yoke 24 terminates in a driving stub axle 26 having an end of other than round shape, preferably square or rectangular in cross-section. The stub axle extends freely through the spindle 12 and through a similarly shaped slot in a wheel plate 27 which is rigidly secured to the exterior surface of the wheel 11, as by riveting or welding. A cotter key or pin 28 retains the axle against movement to the left, as viewed in Figure 4. A collar 29 welded to the axle 26 prevents axial movement of the axle to the right with respect to the spindle. Rotation of the crankshaft 6 thus causes rotation of the axle 26 and consequent rotation of the wheel 11. The universal joint permits steering of the wheel during rotation. An axle cap 52 is added for appearance.

The other front wheel 10 has a supporting assembly exactly the same as that for the wheel 11. The universal joint is omitted. In order to retain the wheel on the spindle I duplicate the end of the stub axle thus providing a short shaft 53 having a welded collar 54 for residence inside the spindle, a cotter key or pin 55 being inserted through the shaft 53 outwardly of the wheel, all being similar to the construction previously described.

In Figures 5, 6 and 7 a variable over-centering device is added to the construction previously described. By this, the line of force applied to a pedal is elevated above the normal radial path when the lever is in one extreme position, and the line of the force is depressed when the lever is shifted to its other extreme position. In the first case the natural and easiest movement of the vehicle is in forward direction while in the second case the natural and easiest movement of the vehicle is in reverse direction. The effect is that the child can "shift gears."

In Figures 5, 6 and 7 all parts are identical with the parts previously described except as may be specifically noted. In this case, the side rails 31 are joined at their front end by a cross member 32 and at the rear end by a cross member 30. Two front wheels 33 and 34 each rotate on a hollow spindle 35 and each spindle has two king pin ears or flanges 36. Secured to each side rail is a bracket 37 having two lateral extensions 38, these extensions being pierced by holes which align with holes in the flanges 36 to receive king pins 39 therewith. This provides for steering of the front wheels, it being understood that steering arms, a steering link, a steering column, a universal joint and stub axle, etc., as described in connection with Figures 1 to 4, are to be added to the showings of Figures 5 to 8 but are omitted in these latter figures to clarify the showing in other respects.

A crankshaft 40 having two crank throws 41 and 42 has its ends extending through aligned holes in side rails 31 and brackets 37, the holes serving as journals although plain or ball bearings may be provided if desired.

Rotatably attached to each crank 41 and 42 is a pedal rod 43 each of which has a pedal 44 pivotally mounted on the outer end thereof.

Secured onto the main frames 31 and 32 is a body, generally indicated by the numeral 45. Pivotally mounted within the body towards the front end thereof and at each side thereof is a manually operable bell crank mounted at 48 on the body 45. These are the reversing arms or "gear shift" levers. The two bell cranks are connected at their lower ends by a shaft 49. Radius rods 50 pivotally connected to the shaft 49 at one end are each pivotally connected at their other end to a pedal 44.

In operation, when the bell cranks or reversing levers are in "forward" drive position as shown in Figure 6 the line of force exerted through the outer pedal 44 is above the axis of the crankshaft, as shown by the arrow. Pressure on that pedal therefore rotates the crankshaft in a direction to cause forward motion of the vehicle. If the reversing levers are then shifted by elevating the handles 47 to the position shown in Figure 7 the line of force exerted through the outermost pedal 44 will be below the axis of the crankshaft, as indicated by the arrow, and the crankshaft will be rotated in a direction to cause the vehicle to move rearwardly.

In either or both forms of my invention, I contemplate that the rear wheels 49 shall be mounted on the ends of a common axle 50 in conventional manner. The main cross member 30 and the side members 31 have aligned openings through which the axle 50 extend, these openings being substantially larger than the diameter of the axle so that the axle has vertical play therein, as illustrated in Figure 8. Extending downwardly through the cross member 30 is a hard pin 51 the lower end of which is contacted by the axle. This pin 51 is preferably threaded so that its contact with the axle may be adjusted. This pin thus constitutes a bearing which permits the body to shift its position vertically with respect to the axle in order to compensate somewhat for unevenness of the ground and, being offset from the center line of the vehicle to the right, as illustrated, it acts to throw the weight of the vehicle onto the left front wheel which does the driving.

Various changes may be made without departing from the spirit of my invention and I desire to be extended protection as defined by the appended claims, wherein

What I claim is:

1. In a child's vehicle, a frame having two wheels near the rear end thereof, an axle for said wheels, a single point rocker support for said frame intermediate the ends of said axle and offset from the middle of said axle, said rocker support being rigidly secured to said frame, said axle having loose fitting engagement with openings through said frame near the ends thereof whereby the rear end of said frame may rock on said rocker support.

2. In a child's vehicle, a frame having two wheels near the rear end thereof, an axle for said wheels, a single point rocker support for said frame on said axle intermediate its ends and offset from the middle thereof, said rocker support being rigidly secured to said frame, said axle having loose fitting engagement with openings in said frame near the ends thereof whereby the rear end of said frame may rock on said rocker support, and means for applying propulsive effort only to the front wheel on the side of the vehicle opposite from that of the offset of said rocker support.

3. In a child's vehicle, a frame having two front wheels and two wheels near the rear end thereof, an axle for said wheels, a single point rocker support for said frame on said axle intermediate its ends and offset from the middle thereof, said rocker support being rigidly secured to said frame, said axle having loose fitting engagement with openings in said frame near the ends thereof whereby the rear end of said frame may rock on said rocker support, a crankshaft between said front wheels having pedals operatively connected to the cranks thereof, the front wheel at the opposite side of said vehicle from said rocker support having a stub driving axle and a universal joint between said crankshaft and said stub axle, the other of said front wheels being freely rotatable independently of the first mentioned front wheel.

4. In a child's vehicle, a frame having two front wheels, one of which is a driving wheel, and two rear wheels, an axle for said rear wheels loosely journalled in said frame and capable of relative vertical movements with respect thereto, and a point support carried by said frame adapted to rest on said axle in direct support of said frame, said point support being offset from the midpoint of said axle whereby said frame may rock thereon, said point support being at the end of said axle opposite the side of said frame to which said front driving wheel is attached.

ALEXANDER J. MIDDLER.

REFERENCES CITED

The following references are of record in the file of this patent:

UNITED STATES PATENTS

| Number | Name | Date |
| --- | --- | --- |
| 807,156 | Cleveland | Dec. 12, 1905 |
| 919,854 | Gross | Apr. 27, 1909 |
| 1,255,595 | Gerson | Feb. 5, 1918 |
| 1,613,356 | Norrish | Jan. 4, 1927 |
| 1,724,725 | Rohm | Aug. 13, 1939 |
| 1,778,143 | Carlson | Oct. 14, 1930 |
| 2,127,104 | Bucklin | Aug. 16, 1938 |
| 2,350,439 | Wright | June 6, 1944 |
| 2,384,950 | Middler | Sept. 18, 1945 |